United States Patent [19]

Charles

[11] 4,157,680

[45] Jun. 12, 1979

[54] DRAINAGE PLATES

[75] Inventor: George K. Charles, London, England

[73] Assignee: Wincanton Engineering Limited, London, England

[21] Appl. No.: 672,954

[22] Filed: Apr. 2, 1976

[30] Foreign Application Priority Data

Apr. 4, 1975 [GB] United Kingdom ............... 14001/75

[51] Int. Cl.$^2$ .................... A01J 25/11; A01J 11/06
[52] U.S. Cl. ...................................... 99/454; 99/458; 99/495; 100/125
[58] Field of Search ................................ 99/456–459, 99/503, 495, 508, 513; 100/110, 125; 426/491, 495; 210/164–165, 402, 498–499; 220/DIG. 2, 1 C, 68

[56] References Cited

U.S. PATENT DOCUMENTS

| 2,583,422 | 1/1952 | Haddon | 210/498 |
| 2,657,994 | 11/1953 | Miollis | 99/456 |
| 3,468,026 | 9/1969 | Robertson | 425/85 |

FOREIGN PATENT DOCUMENTS 92464 3/1962 Denmark ..................... 99/458

*Primary Examiner*—Harvey C. Hornsby
*Assistant Examiner*—Timothy F. Simone
*Attorney, Agent, or Firm*—Browdy & Neimark

[57] ABSTRACT

A perforated drainage plate for use as a lining in a cheese mould has parallel strips punched out of the plane of the plate to one side thereof to form two narrow slots on each side of each strip with the ends of the strips merging smoothly into the undeformed part of the plate. The plate is arranged with the strips abutting against the wall of the mould so that a narrow passageway is formed between the undeformed portion of the plate and the wall of the mould for draining away when forced through the slots. The strips are aligned in the direction in which a cheese block slides out of the mould after removal therefrom. The angle of inclination of the ends of the strips relative to the adjacent portion of the plate does not exceed 30 degrees, the width of the slots does not exceed 0.6 mm, and the radius of curvature of the recessed surfaces of each strip is not less than 1 mm.

3 Claims, 3 Drawing Figures

DRAINAGE PLATES

BACKGROUND OF THE INVENTION

This invention relates to cheese moulds and is concerned more particularly with drainage plates for lining the walls of cheese moulds.

In the manufacture of cheddar or other hard cheese, crumbled cheese curd is mixed with salt and possibly other additives and the curd mixtures subjected to pressure in a mould to press whey out of the curd and thereby form a block of natural cheese. For convenience the mixture of curd and other additives will be referred to hereinafter as curd. The moulds at present in commercial use are generally lined with drainage plates formed with a large number of small apertures spaced evenly over the whole area of the plates, the whey pressed out of the curd passing through the apertures and draining through passages formed between the plates and the walls of the mould. The inside surface of the drainage plates, that is the surface facing the curd, must be smooth to enable the compressed block to slide out of the mould at the end of the pressing operation.

It is known to form drainage plates by punching narrow rectangular portions of a flat plate out of the plane of the plate so as to form narrow strips the ends of which are integral with the remainder of the plate but the center portions of which are spaced from the plate to form slots between the plate and the side edges of the centre portion of the strips. The strips are arranged parallel to one another in rows with the strips in each row offset laterally relative to the strips in the adjacent rows. In use, the drainage plates are fitted in the mould with the side having the recesses formed by punching out the narrow strips facing the curd, and the strips aligned in the direction in which the compressed block of curd slides upon removal from the mould. When the curd is subjected to pressure to expel the whey, the curd is of course forced in to the recesses in the drainage plates and tends to become jammed therein. The force necessary to slide the block out of the mould must then be sufficient to sever the curd in the recesses from the remainder of the block of curd. Also the curd left in the recesses tends to clog up the drainage slots when the next mass of curd is compressed in the mould.

The amount of the force required to overcome the frictional resistance between a block of curd and drainage plates is particularly important in the cheese making apparatus described in U.S. Pat. No. 3,468,026 in the name of G. M. Robertson and G. K. Charles in which the crumbled curd is fed at a sub-atmospheric pressure into a hollow column which is in effect a mould for the cheese, the walls of the column consisting of drainage plates so that the curd is formed into a pillar the weight of which is relied on to provide the pressure for expelling whey from the curd in the bottom of the pillar and for displacing the pillar downwards in the column. The frictional resistance between the pillar of curd and the drainage plates depends upon the texture and variety of the cheese being made, and if the frictional resistance is high there is a risk that the pillar of curd may fracture.

SUMMARY OF THE INVENTION

According to the present invention there is provided a perforated drainage plate for use as a lining in a mould for forming blocks of cheese from crumbled cheese curd, the drainage plate being formed by punching portions of a plate out of the plane of the plate to one side thereof to form parallel strips the ends of which are integral with the remainder of the plate but the center portions of which are spaced from the plate to form drainage slots between the plate and the side edges of the center portions of the strips, wherein the angle of inclination of the ends of the strips relative to the adjacent portion of the plate does not exceed 30 degrees, and the width of the drainage slots does not exceed 0.6 mm. The radius of curvative of the recessed surfaces of each strip is preferably not less than 1 mm.

The drainage plate, in use, must of course be so arranged in the cheese mould that the strips are aligned in the direction in which a cheese block slides out of the mould upon removal therefrom.

Tests carried out with drainage plates according to the invention used as the wall of the vertical column in cheese making apparatus as illustrated in the above-mentioned U.S. Pat. No. 3,468,026 have shown that there is considerably less resistance to movement of the pillar of curd down the column than is the case with apparatus in which the column is made of the prior known drainage plates in which the angle of inclination of the ends of the strips relative to the plate is greater than 30 degrees and the width of the slots is greater than 0.6 mm. There is then far less risk of fracture of the pillar of curd when the pillar is being moved down the column. Moreover, it was also found that, with the apparatus of U.S. Pat. No. 3,468,026 fitted with drainage plates according to the invention, the curd forced into the recesses in the plates tends to slide out of the recesses when the pillar of curd is moved down the column, instead of becoming jammed in the recesses as occurs with the prior known drainage plates. The reduced resistance to movement of the pillar of curd is presumably due to the fact that the curd tends to slide out of the recesses. Since there is little risk of the drainage slots becoming blocked with curd, the size of these slots can be reduced to the minimum necessary to provide adequate drainage. The slots in the drainage plate according to the invention can conveniently be only 0.4 mm wide.

The drainage plate according to the invention can conveniently have a thickness of approximately 0.56 mm, but it may be thinner or appreciably thicker if desired.

BRIEF DESCRIPTION OF THE DRAWING

One construction of cheese making apparatus including a cheese mold fitted with an internal lining comprising drainage plates in accordance with the invention will now be described, by way of example, with reference to the accompanying drawings, in which.

DETAILED DESCRIPTION OF THE PREFERRED EMBODIMENTS

Figure 1:
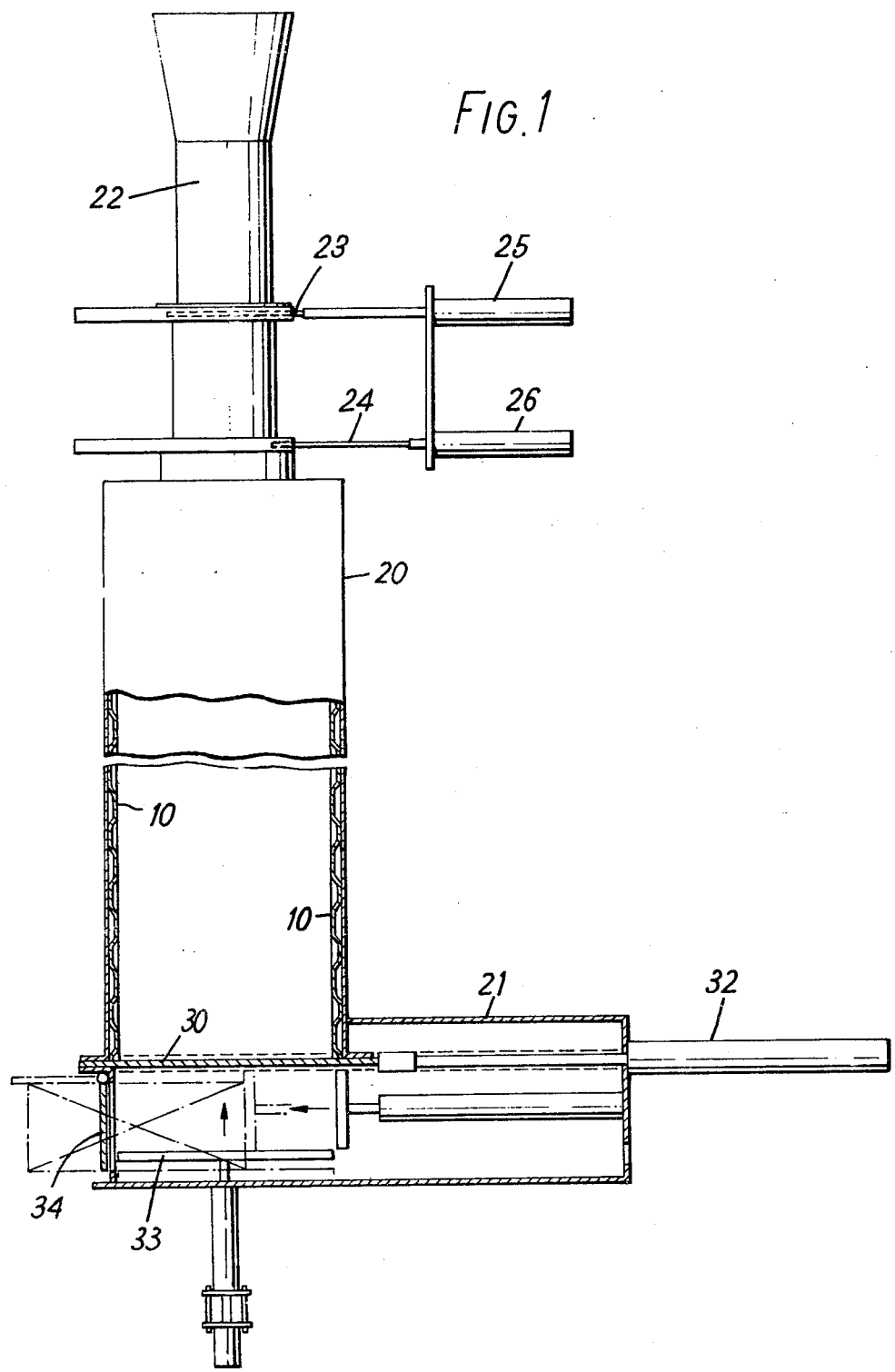
FIG. 1 is a part elevational view of the cheese making apparatus.
Figure 2:
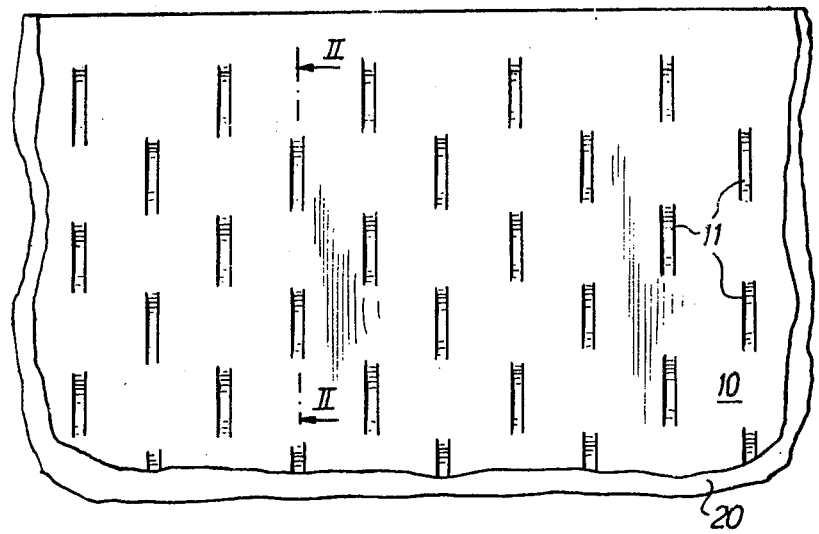
FIG. 2 is a face view of one of the drainage plates forming the lining to the wall of the cheese mold.

The cheese making apparatus of FIG. 1 comprises a cheese mold consisting of an upright tubular casing 20, the lower end of which extends into a hollow lower casing 21. The top of the casing 20 is provided with a hopper 22 arranged to feed curd into the top of the casing under vacuum through an air lock having two slide valves 23, 24 controlled by two cylinders 25,26 respectively. A guillotine blade 30 is mounted in guides in the lower casing 21 and movable by a cylinder 32 between a closed position in which the blade closes the lower end of the casing 20 and an open position in which a pillar of curd in the casing 20 is free to slide down the casing under the control of an elevator 33. Movement of the guillotine blade 30 from the open position to the closed position severs a block of curd from the lower end of the pillar of curd, the block of curd being subsequently removed from the lower casing 30 through an access door 34. The cheese making apparatus illustrated in FIG. 1 is the same as that described and illustrated in U.S. Pat. No. 3,468,026 in the name of G. M. Robertson and G. K. Charles, except that the upright tubular casing 20 forming the cheese mold is fitted with drainage plate 10 in accordance with the present invention.

Each drainage plate 10 has a plurality of narrow strips 11 punched out of the plane of the plate on one side thereof, the ends 12 of the strips being integral with the remainder of the plate but the center portions 13 of the strips being spaced from the plate to form slots 14 between the plate and the side edges of the strips 11. The plate is made of stainless steel with a thickness of approximately 0.56 mm. The strips 11 are approximately 1.5 mm wide, the angle of inclination of the ends 12 of the strips relative to the plate is 25 degrees, the radius of curvature r between the centre portion 13 and the ends 12 of the strips on the recessed surfaces of the plate is 1.25 mm, the radius of curvature s between the ends 12 of the strips and the remainder of the plate on the recessed surfaces of the plate is also 1.25 mm, and the slots 14 are 8 mm long and 0.4 mm wide. The strips are parallel to one another and arranged in rows with the strips in each row spaced 25 mm apart and offset 12.5 mm. laterally relative to the strips in the adjacent row.

Figure 3:
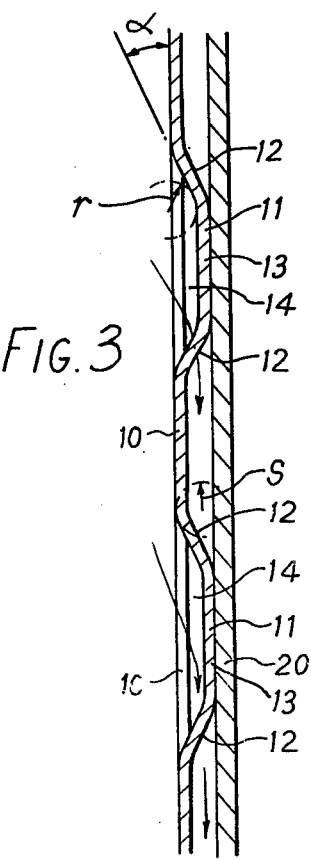
FIG. 3 is a sectional view of the plate and the wall of the mold taken along the line 11—11 in FIG. 2.

In using as a lining for a cheese mould the plate 1 is arranged with the strips 11 abutting against the outer wall 20 of the mould, as shown in FIG. 3, so that a narrow passageway is formed between the undeformed portion of the drainage plate and the outer wall of the mould for draining away whey which has flowed through the slots 14 in the plate.

What is claimed is:

1. In a cheese mold comprising an external casing fitted internally with a lining which defines a mold cavity of substantially constant transverse cross section along the length of the mold to permit a block of cheese curd to slide out of the mold after compression therein, the lining including drainage plates each comprising a given plate having a major portion thereof in a plane and having punched portions thereof out of the plane to the side thereof adjacent the casing to form parallel strips having ends which are integral with said major portion of said given plate and center portions which are spaced from said major portion of said given plate to form drainage slots between said major portion of said given plate and side edges of said center portions of said strips, said drainage plates being arranged with the parallel strips aligned along the length of the mold and in contact with the external casing whereby said major portions of the drainage plates cooperate with the external casing to form passages for drainage of whey pressed out of the curd; and means for reducing the force required to displace said block of curd in said mold to less than that which causes extrusion of the curd through said drainage slots, wherein
 (a) the ends of said strips of each drainage plate are inclined relative to said major portion of said given plate at an angle which does not exceed 30°
 (b) said drainage slots have a width which does not exceed 0.6 mm
 (c) said strips each define a recessed surface having a radius of curvature which is not less than 1 mm.

2. A cheese mold according to claim 1, wherein said angle of inclination of said ends of said strips relative to said major portion of said given plate which is adjacent thereto is approximately 25°.

3. A cheese mold according to claim 1, wherein said drainage slots have widths which are approximately 0.4 mm.

* * * * *